United States Patent [19]
Leshner

[11] Patent Number: 5,251,601
[45] Date of Patent: Oct. 12, 1993

[54] LEAN BURN MIXTURE CONTROL SYSTEM

[75] Inventor: Michael D. Leshner, Columbia, Md.

[73] Assignee: Lean Power Corporation, Silver Spring, Md.

[21] Appl. No.: 920,855

[22] Filed: Jul. 28, 1992

[51] Int. Cl.$^5$ .............................................. F02M 7/00
[52] U.S. Cl. ..................... 123/436; 123/585; 123/443
[58] Field of Search ............... 123/443, 436, 492, 493, 123/585, 589, 309, 590; 60/274

[56] References Cited

U.S. PATENT DOCUMENTS

| | | | |
|---|---|---|---|
| 2,628,606 | 2/1953 | Draper | 123/443 |
| 3,789,816 | 2/1974 | Taplin | 123/443 |
| 4,015,569 | 4/1977 | Leshner | 123/585 |
| 4,015,572 | 4/1977 | Leshner et al. | 123/436 |
| 4,026,251 | 5/1977 | Schweitzer | 123/443 |
| 4,051,672 | 10/1977 | Masaki et al. | 123/443 |
| 4,056,931 | 11/1977 | Hata | 60/274 |
| 4,068,473 | 1/1978 | Masaki | 123/443 |
| 4,099,493 | 7/1978 | Latsch | 123/443 |
| 4,104,990 | 8/1978 | Frobenius | 123/436 |
| 4,123,901 | 11/1978 | Masaki et al. | 60/277 |
| 4,132,198 | 1/1979 | Masaki et al. | 123/443 |
| 4,161,162 | 7/1979 | Latsch | 123/443 |
| 4,231,335 | 11/1980 | Hallberg | 123/443 |
| 4,232,643 | 11/1980 | Leshner et al. | 123/585 |
| 4,368,707 | 1/1983 | Leshner | 123/436 |
| 4,827,887 | 5/1989 | Leshner | 123/493 |

Primary Examiner—Raymond A. Nelli
Attorney, Agent, or Firm—Marks & Murase

[57] ABSTRACT

An automatic control system is shown to vary the mixture of fuel-to-air in a conventional internal combustion engine to minimize resulting pollutants and maximize engine efficiency and performance. The system senses manifold vacuum and engine acceleration and based, in part, upon such inputs forces the mixture leaner until an instability event is detected at which time the system rapidly forces the mixture richer at a predetermined rate and time period to overcome the instability. The mixture is then again forced leaner. The rate of leaning is controlled by the vacuum pressure so that no leaning occurs at or near full throttle and the rate of leaning is decreased as power requirements decrease Further, secondary air is introduced substantially tangentially to the primary air/fuel flow to maximize mixture between the primary and secondary flows.

16 Claims, 5 Drawing Sheets

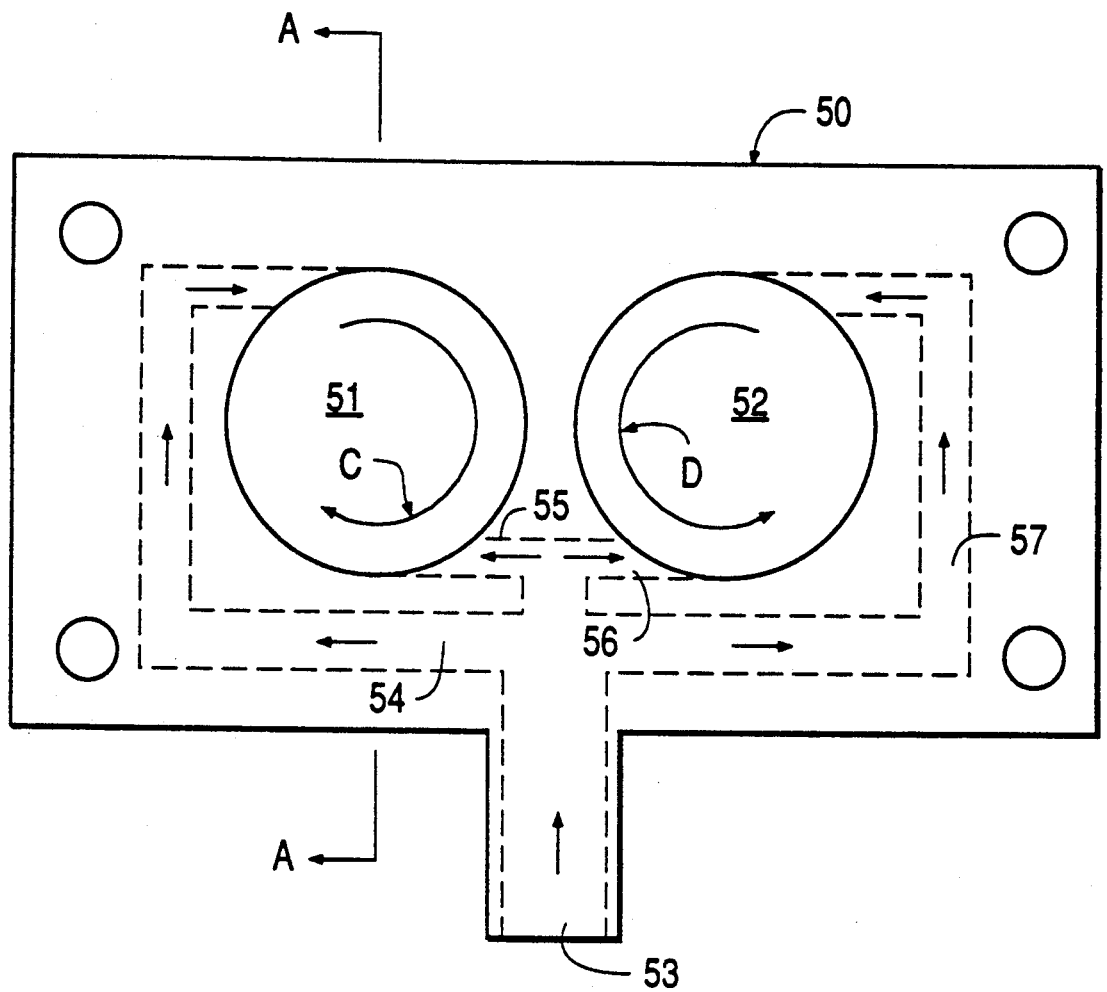
FIG. 5
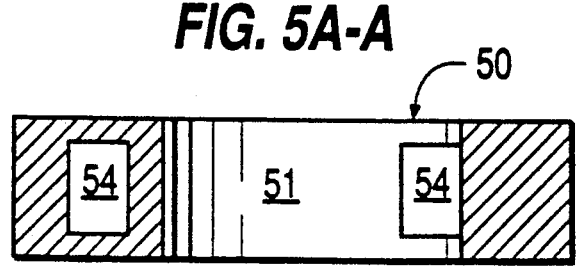
FIG. 5A-A

LEAN BURN MIXTURE CONTROL SYSTEM

FIELD OF THE INVENTION

The present invention relates to a control system to regulate automatically the ratio of air-to-fuel in an internal combustion engine to maintain a lean burn mixture based, in part, upon the rate of change of engine speed and manifold vacuum levels. Secondary air is introduced tangentially to the primary air flow to maximize mixing

BACKGROUND OF THE INVENTION

It is well known in the art that lean fuel/air mixtures may be used advantageously to produce relatively low levels of exhaust emissions and relatively low fuel consumption. However, drivability often suffers when lean mixtures are employed, because mixtures which are slightly "too lean" result in a markedly increased incidence of combustion instability. Combustion instability results in poor drivability and increased emission of hydrocarbons.

A measurement of engine acceleration has been shown to be a reliable source of information regarding combustion instability. Engine acceleration may be measured by monitoring changes in the speed of the engine, or by measuring the motion of the engine. Further, it has been shown that control systems may be constructed which continuously urge the fuel/air mixture leaner, until an indication of "over-leanness" (combustion instability) is detected at which time the mixture is urged richer. However, these systems require the mixture to be over lean for a period of time before the mixture responds to the enrichening.

Control systems for automobile engines must be especially fast and accurate to provide the correct quantities of fuel and air at each moment in time, while the engine experiences rapid changes in throttle position, speed, and load The ability of a control system to quickly adjust its mixture based on changes in operating conditions is characterized as overall system response Therefore, a need exists to minimize the response time for a lean burn mixture control system.

SUMMARY OF THE INVENTION

In this invention, the correction provided by the control system in response to an indication of "over-lean" combustion is very rapid. Mixture changes in the "lean" direction are made relatively smoothly, while corrections in the "rich" direction are made in rapid "jumps." This correction process is performed without any time delay for such things as subtractions, comparisons, integration, etc. The process of initiating rapid step-function mixture corrections immediately following the detection of an unstable combustion event provides a significant improvement over the prior art in overall system response.

Therefore, it is an object of this invention to provide faster system response, so that the optimum fuel/air mixture may be supplied at all times—even through changes in operating conditions—without suffering combustion instability.

FIG. 1A shows changes in the mixture over time for control systems using equal response speeds in both the rich and lean directions. As shown in FIG. 1A, the mixture resides below the Lean Combustion Boundary for a period of time FIG. 1B shows changes in the mixture over time for the control system of the present invention. The rapid "jump" response in the rich direction minimizes the occurrences of overly-lean mixtures. Further, the fast response in the lean direction keeps the mixture near the lean combustion boundary Thus, the present invention produces a "sawtooth" relationship for the fuel/air mixture over time. In the "sawtooth" example, the control system follows the Lean Combustion Boundary, without producing "overlean" combustion.

In U.S. Pat. Nos. 3,789,816 to Taplin; 4,099,493 to Latsch; and 4,104,990 to Frobenius, the system response is limited by the sampling technique. A portion of one engine revolution must be sampled and compared with a reference before a control decision is made. This time limitation slows down the overall system response.

In the previous Leshner patents—including U.S. Pat. Nos. 4,015,569; 4,015,572; 4,232,643; 4,368,707; and 4,827,887—a final control element (the stepper motor) receives signals from a clock with instructions to step leaner at a predetermined rate, and another instruction to step richer each time a weak combustion event is detected. For example, the abstract of U.S. Pat. No. 4,368,707 specifies:

"The clock frequency thus sets the equilibrium rate of weak combustion events, defining the optimal mixture to be supplied to the engine."

These patents teach a method of subtracting two opposing signals, and effecting a response which corresponds to the difference between these signals. This control strategy creates a mixture which is slightly over-lean much of the time, resulting in degraded drivability and hydrocarbon emissions.

The new invention allows a bias toward the rich side of the boundary of lean drivability, without dwelling excessively on the lean side of the boundary By rapidly "jumping back" each time "over-lean" combustion is detected, the control system keeps a nominal margin from the edge of over-lean drivability. This control scheme allows the response of the servo to be increased, while minimizing the tendency for "overshooting" into the over-lean regime during transient operation.

The advantages of this invention over the prior art are reduced hydrocarbon emissions and improved drivability. This result is derived from the improved speed of response of the control system, made possible by faster corrections in the rich direction. This invention is particularly useful in mobile applications such as automobiles, to effect the optimum tradeoff among the following four variables:

Harmful exhaust emissions (HC, CO, $NO_x$)
Fuel consumption
Drivability (degree to which power is smooth and responsive)
Cost

BRIEF DESCRIPTION OF THE DRAWINGS

FIG. 5 is a top view of the air-addition plate of the system of FIG. 1B.

FIG. 5A—A is a cross section of the air-addition plate of FIG. 5 taken along line A—A.

DESCRIPTION OF A PREFERRED EMBODIMENT

Figure 1A:
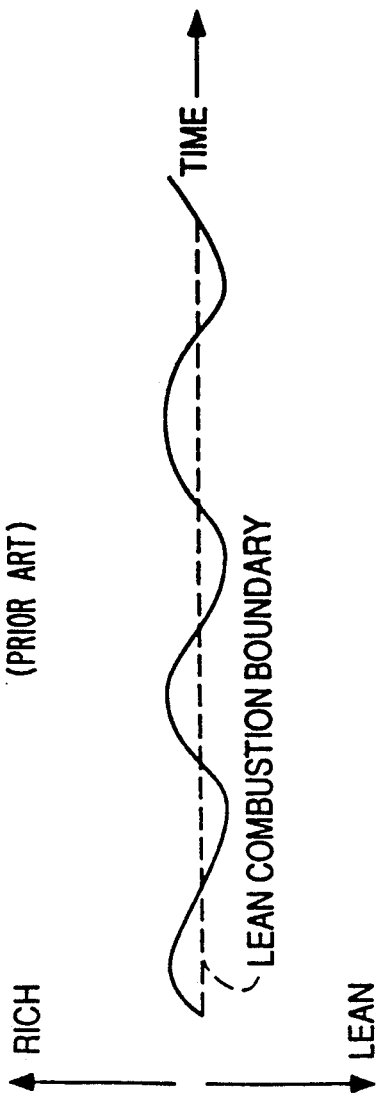
FIG. 1A is a graphic representation of the mixture versus time for control systems employing relatively equal response speeds in the rich and lean directions as shown in the prior art.
Figure 1B:
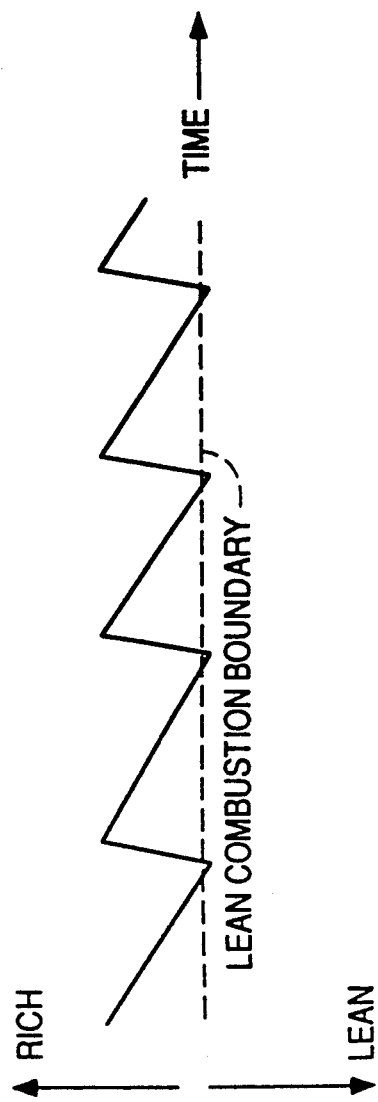
FIG. 1B is a graphic representation of the mixture versus time for the control system of the present invention.
Figure 2:
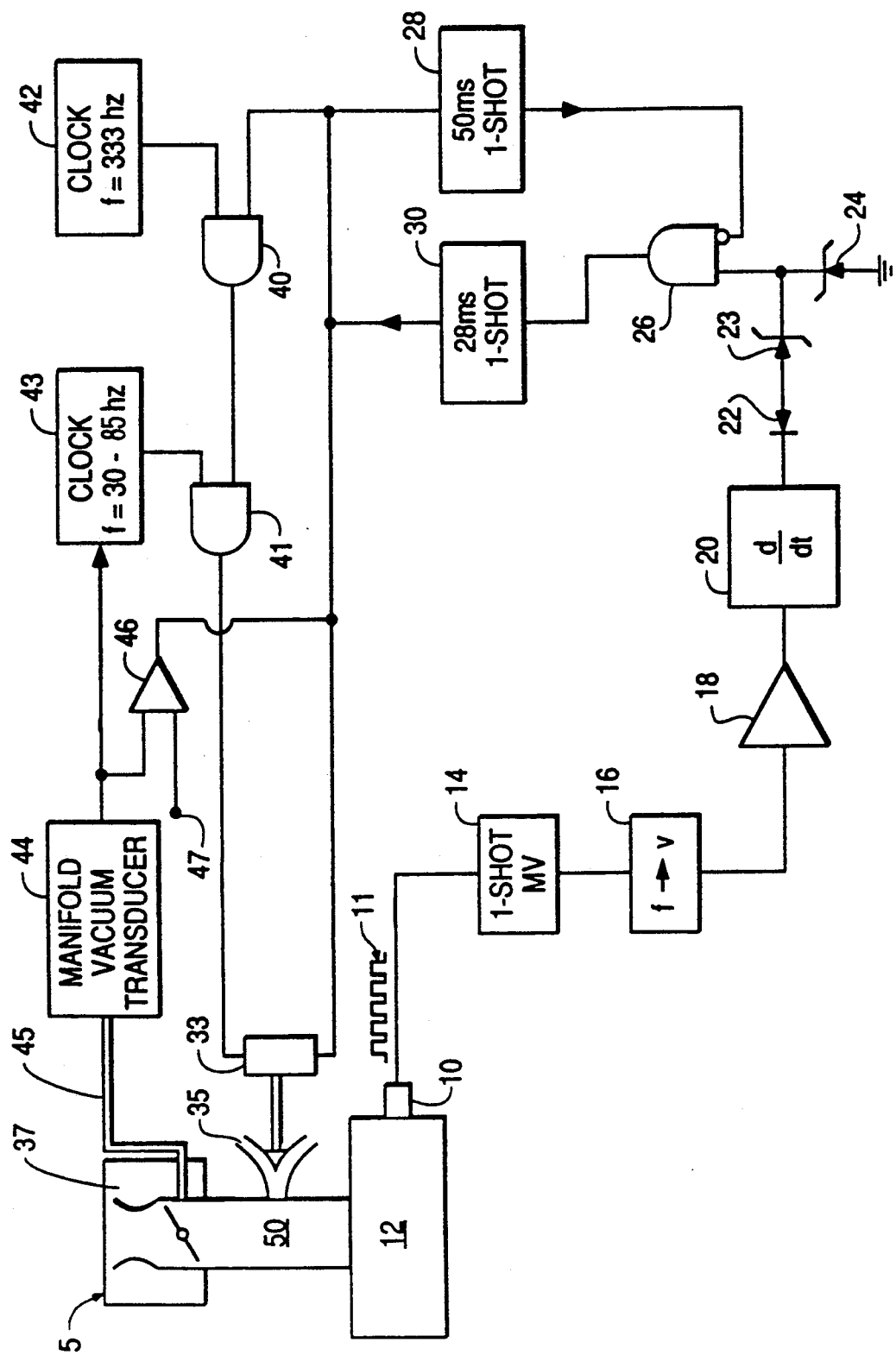
FIG. 2 is a logic diagram of the lean burn mixture control system of FIG. 1B.

FIG. 2 is a logic diagram for the lean burn control system 5 of the present invention for a conventional spark ignition internal combustion engine 12. While engine 12 is described as a conventional spark ignition internal combustion engine, the invention is applicable to all types of internal combustion engines, including but not limited to, free-piston engines, turbines, and "Wankel" or rotary engines. Therefore, such terms as "manifold," "carburetor," "air plate," and "throttle," should be regarded as being used in the generic sense regardless of the specific form which they may take in a given application. The engine 12 includes a carburetor 37. An air valve 35 admits secondary or supplemental air into the engine 12 through an air-addition plate 50 between the throttle and the engine 12. A stepping motor 33 controls the size of the opening of valve 35. Thus, the stepping motor 33 adjusts the valve 35 either to increase the ratio of fuel-to-air (i.e., move in a rich direction) or to decrease the ratio of fuel-to-air (i.e., move in a lean direction).

FIG. 2 shows a means to detect the direction and rate of change of the speed of the engine 12. A transducer 10 (in the preferred embodiment the transducer 10 is of a magnetic pick-up type or variable inductance magnetic pick-up type) is placed in close proximity to a flywheel ring gear which is fixed to the crank shaft of the engine 12 and by its placement the transducer 10 detects the passing of the flywheel gear teeth. Next to transducer 10 in FIG. 2 is a representation of the pulse train output signal 11 from transducer 10. Thus, the frequency of the pulses in pulse train 11 varies with the speed of engine 12.

The pulse train signal 11 is processed by one-shot multi-vibrator 14 and then through tachometer 16 which converts the train of pulses 11 of varying frequencies into corresponding various voltages. Thus, the voltage output of tachometer 16 varies with the speed of the engine 12.

The voltage is then amplified by an operational amplifier 18 and the resulting signal is sent to differentiating circuit 20. Accordingly, the output of circuit 20 reflects both the direction of the rate of change of speed of engine 12 (e.g., faster-to-slower, slower-to-faster or no change of speed) and the amount of speed change (e.g., the amount of acceleration or deceleration).

The signal from circuit 20 is sent to diode 22 which passes only signals from circuit 20 representing a negative rate of change in the speed of the engine 12 (i.e., the engine decelerating). The Zener diode 23, in turn, passes only negative going changes in the speed of the engine 12 which exceed a predetermined threshold, represented by the value of Zener diode 23. A clipper such as Zener diode 24 is also provided consistent with good circuitry practice.

When a weak combustion event is imminent in the engine 12 because, for example, the mixture is too lean, it is desirable to detect and overcome the event by rapidly sending a richer mixture to the engine 12. Because a weak combustion event results in the engine 12 decelerating above a threshold minimum rate, the system 5 is designed to detect deceleration indicative of a weak combustion event and send a correcting signal to stepping motor 33 to overcome the event. Thus, the diode 22 and Zener diode 23 filter out signals except those signals which could indicate a weak combustion event (i.e., negative going signals above a threshold level). How the system 5 responds to the detection of a weak combustion event will be discussed next.

Signals from element 23 indicative of a weak combustion event are passed on through an AND gate 26 to a 28 millisecond one-shot multi-vibrator 30. The one-shot multi-vibrator 30 sends out a pulse of sufficient duration (e.g., 28 milliseconds) to enable stepping motor 33 sufficient time to respond to the event by creating a "richer" mixture and counteracting the weak combustion event.

At the same time, the one-shot multi-vibrator 30 also puts out a 28 millisecond pulse which is fed back into a second one-shot multi-vibrator 28 which sends out a 50 millisecond pulse. The output of the one-shot multi-vibrator 28 enters the inverting input of the AND gate 26. This "loop" (multi-vibrator 30 to multi-vibrator 28 to AND gate 26 back to multi-vibrator 30) disables one-shot multi-vibrator 30 from emitting a second pulse for at least 50 milliseconds following a first triggering of multi-vibrator 30. This ensures a minimum spacing between output pulses from one-shot multi-vibrator 30 so that—even in the case where a plurality of corrections are required—the correction pulses will have a minimum spacing of 50 milliseconds.

The reason for this spacing is that when a correction is required in the engine 12, the corrected mixture (i.e., richer mixture to overcome the event) must be drawn into the engine 12, compressed, ignited and expanded. This takes time. Accordingly, one would not expect to see the result of a given correction for approximately one or two revolutions of the engine 12, which corresponds to the 50 milliseconds inhibition of a succeeding correction. Thus, the 50 millisecond spacing provides the engine 12 sufficient time to respond to a correcting pulse from multi-vibrator 30 before another correcting pulse, if necessary, can be generated. This minimizes the chance for overshooting or overcorrection by system 5. Other time durations may be used, but for the preferred embodiment the time pulses are 28 and 50 milliseconds for vibrators 30 and 28, respectively.

The 28 millisecond correction performs two other functions: It reverses the direction of the stepping motor 33 so that the motor 33 travels in the direction which enriches the mixture (i.e., closes the valve 35) and it changes the stepping frequency (or rate) to a much higher frequency predetermined by clock 42 so that during the 28 millisecond pulse there are a rapid number of steps in the rich direction to overcome the event. The system 5 has a fixed frequency oscillator clock 42 with a preferred frequency of 333 hertz. The frequency of clock 42 determines the number of steps taken in the rich direction during the 28 millisecond correction period. The 333 hertz frequency equates to 3 milliseconds between pulses. Thus, each correction totals 10 steps in the rich direction in the preferred embodiment.

Figure 4:
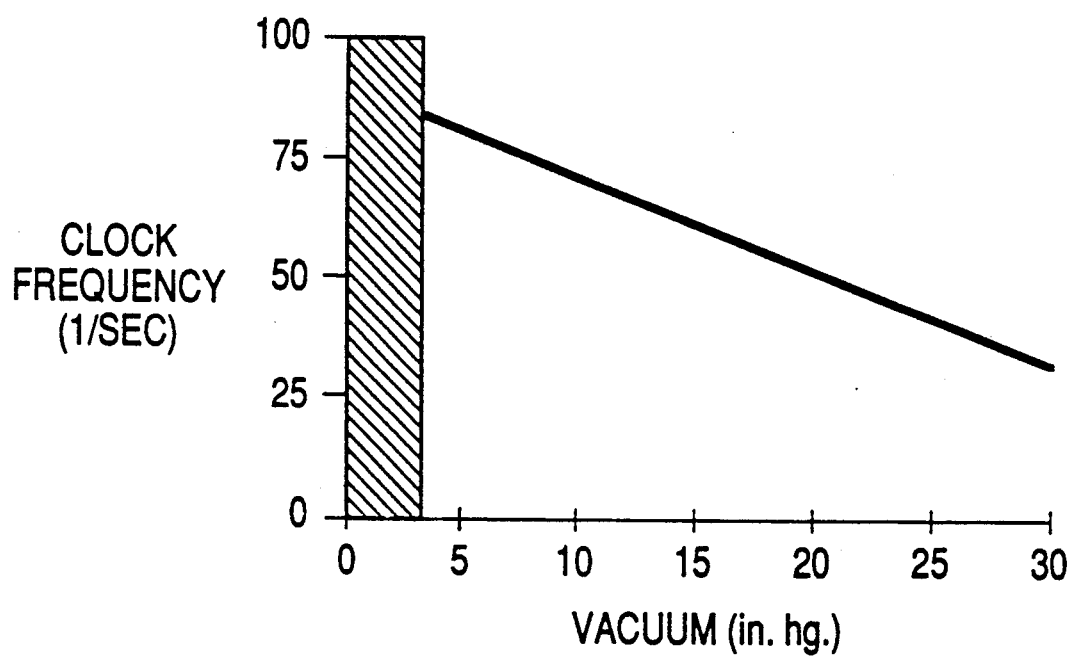
FIG. 4 is a graphic representation of the frequency of the variable clock versus the vacuum level in the manifold of the system of FIG. 1B.

System 5 automatically varies the rate at which the mixture is forced lean during "nominal" operation (i.e., when no weak combustion event has been detected) in order to maximize responsiveness and minimize pollutants at various performance levels, as discussed more fully below. Vacuum level signal 45 is generated by the engine 12 and reflects the power requirements of the engine 12 in a generally inverse relation. For example, at high power levels the vacuum pressure is low. The intake manifold vacuum transducer 44 receives a vacuum signal 45 from the engine 12 and outputs a signal which controls the frequency of the clock 43. Variable frequency oscillator clock 43 has a preferred frequency range of between 30 to 85 hertz. Changes to the frequency of clock 43 are accomplished by feeding the voltage output of transducer 44 into the frequency determining input of clock 43. For example, as shown in FIG. 4, relatively high levels of intake manifold vacuum would cause the clock 43 to run at about 30 hertz, while relatively low manifold vacuum levels would cause the frequency to vary up to approximately 80 hertz. The frequency of clock 43 determines the rate at which the stepping motor 33 will go lean when the system 5 is in its nominal state. The higher the frequency of clock 43, the faster the stepping motor 33 steps and the faster the mixture goes lean. The frequency range of 30 to 85 hertz is by way of example and other ranges may be used. Thus, the system 5 automatically matches the frequency of clock 43 to the power requirements of the engine 12—based upon the level of manifold vacuum 45—to maximize the performance of the engine 12 as discussed below.

The output of clocks 42 and 43 are sent to AND gates 40 and 41, respectively. The AND gates 40 and 41 combine signals. The two signals that feed AND gate 40 are the 28 millisecond signal representing a weak combustion event and the clock 42 frequency of 333 hertz. Thus, the output of AND gate 41 is a composite signal which is used to command the final control element stepping motor 33 to take a step. Specifically, whenever there is a pulse at the output of AND gate 41, the stepping motor 33 takes one step.

In summary, the engine 12 has a carburetor 37. Secondary air enters carburetor 37 through valve 35 which is controlled by final control element stepping motor 33. In the absence of any detection of weak or unstable combustion, stepping motor 33 is commanded to open the valve 35 in a lean direction at a rate set by clock 43 and dependent upon the manifold vacuum pressure (e.g., a frequency of 30 to 85 hertz). Upon the detection of a weak combustion event, the final control element stepping motor 33 is commanded to reverse direction and make a correction in the rich direction by closing valve 35 for a predetermined time period (e.g., 28 milliseconds) at a predetermined frequency step rate, determined by clock 42 (e.g., a frequency of about 333 hertz) resulting in a predetermined number of "rich" steps (e.g., 10 steps).

FIGS. 3A-E are shown in phase relationship to one another. Dashed line A in FIGS. 3A-E reflects the point of time at which system 5 detects a weak combustion event. Dashed line B in FIGS. 3A-E reflects the end of the correction time period (e.g., 28 milliseconds after dashed line A).

Figure 3A:
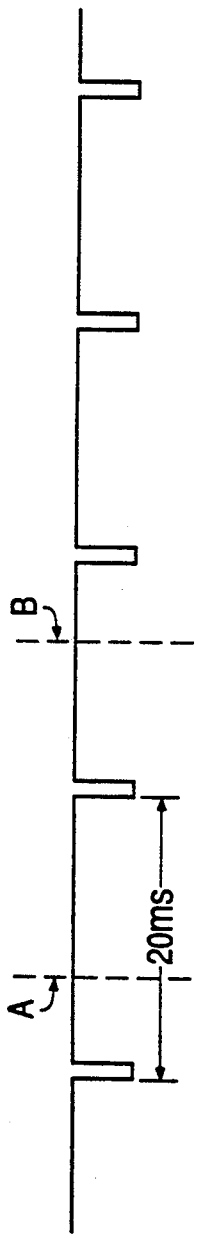
FIG. 3A is a graphic representation of the output of the variable clock of the system of FIG. 1B.

FIG. 3A represents the output from the clock 43. Although the output of the clock 43 is variable, in this example FIG. 3A shows a nominal output frequency of 50 hertz resulting in approximately 20 milliseconds of spacing between the "go lean" pulses. Thus, in its nominal condition in this example the stepping motor 33 makes one step in the lean direction every 20 milliseconds when there is no correction being commanded by the system 5.

Figure 3B:
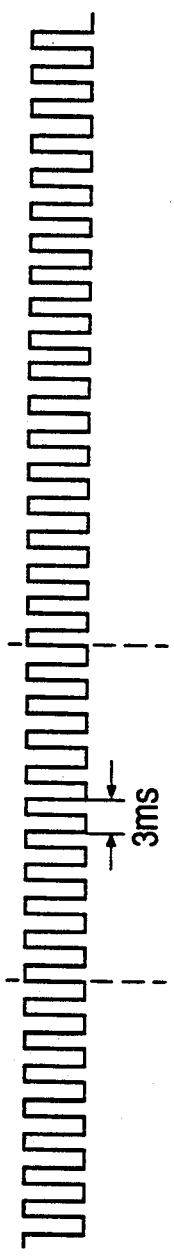
FIG. 3B is a graphic representation of the output of the fixed frequency clock of the system of FIG. 1B.

FIG. 3B represents the output of the fixed frequency clock 42 which, in the preferred embodiment, is 333 hertz resulting in approximately 3 milliseconds of spacing between the "go rich" pulses.

Figure 3C:
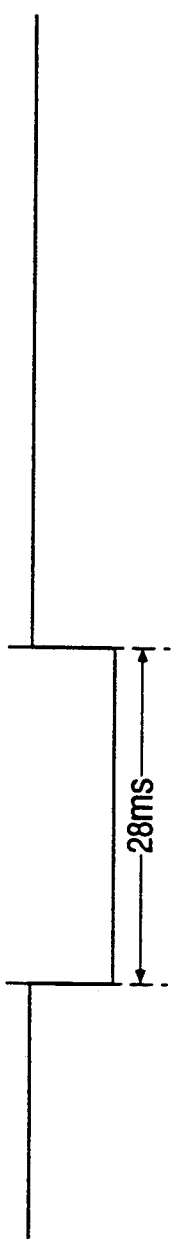
FIG. 3C is a graphic representation of the output of the first one-shot multi-vibrator of the system of FIG. 1B.

FIG. 3C represents the output signal of the first one-shot multi-vibrator 30. When the signal is high, the system 5 has not detected the existence of a weak combustion. When a weak combustion event is detected by the system 5, the signal from multi-vibrator 30 goes low for a period of 28 milliseconds.

Figure 3D:
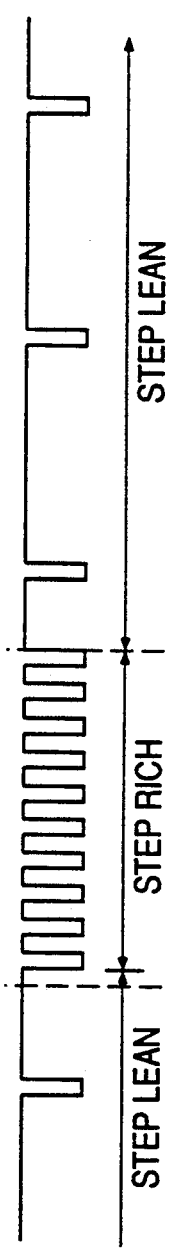
FIG. 3D is a graphic representation of the output of an AND gate of the system of FIG. 1B.

FIG. 3D shows the shape of the signal at the output of AND gate 41 which represents the composite signal of AND gate 40 and multi-vibrator 30 and is the control signal sent to the stepping motor 33.

FIGS. 3A-D show that in the absence of a correction (i.e., while FIG. 3C is in its high state), pulses from the clock 43 go to the motor 33 and the motor steps in the lean direction at the frequency of 50 hertz. Once a weak combustion event is detected, a 28 millisecond correction is initiated. During the TM 28 millisecond correction (shown in FIG. 3C) the direction of the steps of the stepping motor 33 is reversed from go lean to go rich and the frequency of the steps of the stepping motor 33 is increased as determined by the frequency of fixed clock 42 (e.g., 333 hertz which equals one go rich step every 3 milliseconds) for the duration of the 28 millisecond correction. After the 28 millisecond correction is completed, the stepping rate and direction of the motor 33 reverts back to a rate of one go lean step every 20 milliseconds, as shown in FIG. 3A. Thus, as shown in FIG. 3D, during the period before the correction is initiated (i.e., to the left of dashed line A), the motor 33 is travelling in a lean direction (i.e., opening the valve 35) and a frequency of 50 hertz. During the correction (i.e., between dashed lines A and B), the motor 33 is traveling more rapidly in the rich direction (i.e., closing the valve 35) at a frequency of 333 hertz. After the 28 millisecond correction has elapsed (i.e., to the right of line B), the motor 33 is travelling forward again opening the valve 35 and causing the mixture to become leaner again at the rate of 50 hertz.

Figure 3E:
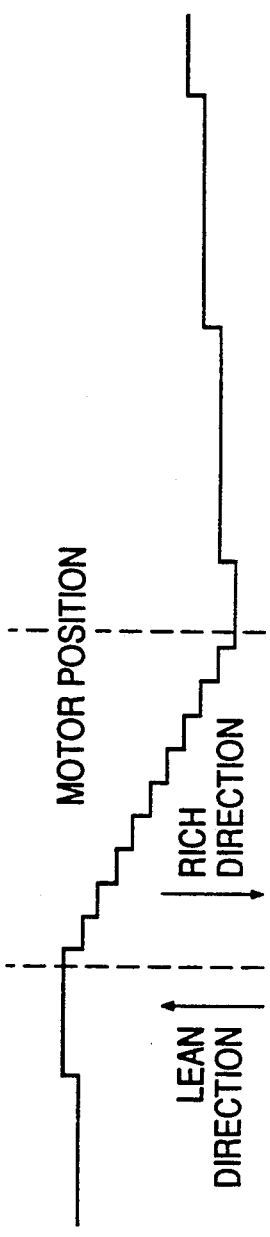
FIG. 3E is a graphic representation of the position of the stepping motor of the system of FIG. 1B.

FIG. 3E shows the position of motor 33 in time relationship with FIGS. 3A-D. As the first pulse in FIG. 3D occurs it effects one step in the lean direction and the position of motor 33 moves one step in the lean direction (i.e., up the page) During the 28 millisecond correction, the motor 33 steps in the rich direction (i.e., down the page) at a more rapid rate and, in this example, takes 10 steps in the rich direction during the 28 millisecond correction. Following that correction, the system 5 detects no additional weak combustion events and the motor 33 takes three steps in the lean direction, at the rate of one step every 20 milliseconds. Thus, FIG. 3E shows the motor 33 going lean, taking 10 quick steps rich and then going lean again. FIG. 3E illustrates two different rates of travel depending on whether the motor 33 is effecting a leaning or enrichening of the fuel/air mixture.

As noted above, the frequency output of clock 43 is controlled by the intake manifold vacuum 45 to improve engine performance. FIG. 4 shows the relationship between the signal from the vacuum transducer 45 and the frequency of clock 43. At very low levels of vacuum (in this example, 0–3 inches of mercury) the power requirements on the engine 12 are very high and the throttle is nearly fully open (shown as the shaded region in FIG. 4). Under these conditions it is neither desirable nor advantageous to use a lean mixture. During these very low vacuum levels, the valve 35 is caused to stay closed. Specifically, the output voltage of transducer 44 is connected to one input of comparator 46. Reference voltage 47 equals the voltage output from transducer 44 when the vacuum pressure level 45 is 3 inches of mercury and is connected to the second input of comparator 46. The output of comparator 46 is connected to the output of multi-vibrator 30 and is able to override multi-vibrator 30. Thus, at low values of manifold vacuum (e.g. between 0 and 3 inches of mercury), multi-vibrator 30 is overridden, and the stepping motor 33 is caused to run continuously at 333 hertz in the reverse direction, keeping valve 35 closed.

At power levels equaling vacuum levels in the 5–10 inches of mercury range, the throttle is substantially open—but not fully open—and under these conditions the mixture is optimally quite lean for the purposes of emission control and fuel economy. As shown in FIG. 4, the relationship between the frequency of clock 43 and vacuum 45 changes in a substantially linear fashion between about 5 inches and about 25 inches of mercury.

At approximately 20 inches of mercury, the engine 12 is experiencing a very low power condition and the throttle is substantially closed. Under such conditions even slight irregularities in the combustion would be easier to detect and, accordingly, a very lean mixture is undesirable. Thus, in this range, for reasons of improved drivability, the frequency of clock 43 is biased lower at high vacuum levels which, in turn, biases the fuel/air ratio richer in the region of 15–20 inches of mercury, as compared to the ratio of the mixture for the 5–10 inches range. The vacuum levels specified are by way of example only and other levels may be used.

In summary, it is generally desirable to bias the control system richer or leaner, dependent on the intake manifold vacuum 45 in the engine 12 for the purpose of improving drivability and reducing exhaust emissions. When the throttle is fully open, the driver needs full power and a lean mixture is undesirable. In this example, when the vacuum is between 0–3 inches of mercury, the leaning function is disabled entirely. In the high-power regions where the throttle is not fully open—for example, the region of 5–10 inches of mercury manifold vacuum —the leanest mixture that is consistent with smooth engine operation is desirable. In the region of 15–20 inches of mercury which represents very low power levels—the mixture should be biased slightly richer because under these conditions the driver may be able to detect weak combustion or unstable combustion more easily than at higher power levels. Thus, in the range of 3–25 inches of mercury manifold vacuum, the system biases the mixture slightly richer or leaner by changing the frequency of clock 43. This change in clock frequency 43 has the effect of tailoring the fuel-to-air mixture to the power level of the engine 12 and effects a better tradeoff between exhaust emissions and drivability.

FIG. 5 shows the air-addition plate 50 which is mounted between the carburetor and the intake manifold of the engine 12 for the purpose of admitting secondary (e.g., supplementary) air into the engine 12 to effect a leaner fuel-to-air mixture. The primary fuel/air mixture passes from the intake manifold through cylindrical main passageways 51 and 52. Secondary air enters the plate 50 through entrance passageway 53. The secondary air is then channeled to the passageways 51 and 52 through four secondary passageways 54, 55, 56 and 57 shown in phantom line in FIG. 5.

The secondary passageways 54, 55, 56 and 57 are constructed to produce a swirl in the main passageway 51 and 52. More specifically, secondary air passages 54 and 55 connect with cylindrical main passageway 51 tangential to the axis of cylindrical passageway 51. Thus, secondary air entering passageway 51 from secondary passageways 54 and 55 will tend to swirl with the primary fuel/air mixture in passageway 51. This swirl will be in a generally clockwise direction in passageway 51 as shown by arrow C.

Similarly, secondary passageways 56 and 57 impart a counterclockwise swirl to the primary fuel/air mixture in main passageway 52.

FIG. 5A—A shows, in cross-section, the construction of plate 50. The entry of secondary passageway 54 to main passageway 51 is shown in FIG. 5A-A. The use of four secondary passageways is by way of example only and greater or fewer passageways may be used.

The benefit of introducing the secondary flows tangential to the primary flow is to maximize the mixture of secondary air from passageways 54, 55, 56 and 57 with the primary mixtures in passageways 51 and 52. Thus, by maximizing the mixtures of the primary and secondary flows, the overall responsiveness of system 5 is improved.

While there has been illustrated and described a particular embodiment of the present invention, it will be appreciated that numerous changes and modifications will occur to those skilled in the art and it is intended in the appended claims to cover all those changes and modifications which fall within the scope of the present invention.

What is claimed as new and desired to be secured by Letters Patent of the United States is:

1. An engine having a control system for controlling a valve means in said engine to alter the ratio of the fuel/air mixture applied to said engine, comprising:
   means for controlling said valve means to alter said ratio of the fuel/air of said mixture wherein said controlling means generally is changing said ratio of said mixture at a first rate and in a leaner direction;
   means for detecting the occurrence of deceleration in said engine above a set value indicative of a weak combustion event, said detection means further having means for generating a signal and sending said signal to said controlling means when said deceleration above said set value is detected; and
   said controlling means, upon receipt of said signal, changing said ratio of said mixture at a second rate and in a richer direction for a predetermined period of time, said second rate being faster than said first rate, after which said period of time said controlling means again changes said ratio at said first rate and in said leaner direction.

2. The engine of claim 1, wherein said controlling means includes a stepping motor.

3. The engine of claim 1, wherein said first rate is variable.

4. The engine of claim 3, wherein said variable rate is between 30 and 85 hertz.

5. The engine of claim 1, wherein said second rate is fixed.

6. The engine of claim 5, wherein said fixed rate is 333 hertz.

7. The engine of claim 1, wherein said period of time is 28 milliseconds.

8. Means for altering the ratio of the fuel/air mixture as set forth in claim 1, wherein a generally cylindrical passageway means is provided to enable a thorough mixing of a primary fuel/air blend stream with a secondary air in a multi-cylinder engine, wherein said generally cylindrical passageway means provides said mixing by moving said primary fuel/air blend stream through said generally cylindrical passageway means in a coaxial direction, then applying said secondary air generally tangentially to said coaxial direction of said primary fuel/air blend stream through a tangential passageway means.

9. An engine having a control system for controlling the ratio of fuel/air mixture applied to said engine, comprising:
   means for adjusting the ratio of fuel-to-air in said engine;
   first controlling means for controlling said ratio adjusting means;
   second controlling means for controlling said ratio adjusting means, said second controlling means including an adjustable clock means to generate input timing signals at a preselected frequency wherein the frequency of said input timing signals may be varied;
   measuring means for measuring the power requirements of said engine, said measuring means further including means for generating a signal of said power requirements and sending said signal to said first and second controlling means;
   said frequency of said adjustable clock means being controlled by the signal from said measuring means to decrease gradually the frequency of said timing signals as the power requirement decreases;
   wherein said first controlling means operates said ratio adjusting means to provide a very rich ratio to said engine upon receipt of a signal form said measuring means indicative of a power requirement above a first predetermined value, corresponding generally to said engine being operated at full throttle; and
   further wherein said second controlling means, upon receipt of a signal from said measuring means indicative of a power requirement below said first predetermined value, operates said ratio adjusting means to provide a gradually richer ratio to said engine as said power requirement, and hence, the frequency of said timing signals, decreases.

10. The engine of claim 9 wherein said measuring means includes a means to detect a manifold vacuum pressure level in said engine which corresponds generally to the power requirements of said engine.

11. The engine of claim 10, wherein said first predetermined value corresponds to a vacuum pressure of approximately three inches of mercury.

12. The engine of claim 10, wherein when said predetermined value correspond to a vacuum pressure of approximately ten inches of mercury, said frequency of said timing signals is approximately 65 pulses per second.

13. The engine of claim 10, wherein when said predetermined value corresponds to a vacuum pressure of approximately 20 inches of mercury, said timing signal frequency is approximately 50 pulses per second.

14. The engine of claim 10, wherein said measuring means includes a vacuum transducer.

15. The engine of claim 9, wherein said adjusting means includes a stepping motor.

16. The engine of claim 9, wherein the relationship of said power requirement and said frequency is substantially linear.

* * * * *